United States Patent
Gershman (10) Patent No.: US 8,611,234 B1
(45) Date of Patent: Dec. 17, 2013

(54) NETWORK INTERFACE WITH CABLE TRACING

(75) Inventor: Vladimir Gershman, Holland, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 113 days.

(21) Appl. No.: 13/180,390

(22) Filed: Jul. 11, 2011

(51) Int. Cl.
*G01R 31/08* (2006.01)

(52) U.S. Cl.
USPC .......................................... 370/251; 370/252

(58) Field of Classification Search
None
See application file for complete search history.

(56) References Cited

U.S. PATENT DOCUMENTS

| | | |
|---|---|---|
| 4,933,962 A | 6/1990 | Sanders |
| 5,141,449 A | 8/1992 | Tieszen |
| 5,285,163 A | 2/1994 | Liotta |
| 5,414,343 A | 5/1995 | Flaherty et al. |
| 5,463,706 A | 10/1995 | Dumont et al. |
| 5,583,874 A * | 12/1996 | Smith et al. ................. 714/712 |
| 5,601,448 A | 2/1997 | Poon |
| 5,649,111 A | 7/1997 | Rehquate et al. |
| 5,666,453 A | 9/1997 | Dannenmann |
| 5,764,043 A | 6/1998 | Czosnowski et al. |
| 5,831,436 A | 11/1998 | Borland |
| 5,876,863 A | 3/1999 | Feldman et al. |
| 6,017,241 A | 1/2000 | Komai |
| 6,285,293 B1 | 9/2001 | German et al. |
| 6,356,084 B1 | 3/2002 | Levine |
| 6,437,580 B1 | 8/2002 | Gale |
| 6,466,033 B2 | 10/2002 | Soghomonian |
| 6,577,243 B1 | 6/2003 | Dannenmann et al. |
| 6,710,254 B2 | 3/2004 | Yueh |
| 6,817,890 B1 * | 11/2004 | Schindler ....................... 439/490 |
| 6,820,225 B1 * | 11/2004 | Johnson et al. ................ 714/715 |
| 6,851,818 B2 | 2/2005 | Sharon et al. |
| 6,957,001 B2 | 10/2005 | He |
| 6,973,517 B1 | 12/2005 | Golden et al. |
| 6,975,242 B2 * | 12/2005 | Dannenmann et al. .. 340/815.45 |
| 7,029,137 B2 | 4/2006 | Lionetti et al. |
| 7,049,937 B1 | 5/2006 | Zweig et al. |
| 7,075,283 B1 * | 7/2006 | Lo et al. ....................... 324/73.1 |
| 7,221,284 B2 | 5/2007 | Scherer et al. |
| 7,393,249 B2 | 7/2008 | Wagner et al. |
| 7,399,105 B2 | 7/2008 | Southard et al. |
| 7,519,003 B2 | 4/2009 | Koziy et al. |
| 7,524,082 B2 | 4/2009 | North |
| 7,679,371 B1 * | 3/2010 | Lo .................................. 324/533 |
| 7,742,577 B1 * | 6/2010 | Reddy ............................. 379/21 |
| 7,804,784 B1 * | 9/2010 | Lo .................................. 370/251 |
| 2003/0222786 A1 | 12/2003 | Dannenmann et al. |
| 2004/0149998 A1 | 8/2004 | Henson et al. |
| 2006/0057876 A1 | 3/2006 | Dannenmann et al. |
| 2006/0061369 A1 | 3/2006 | Marks et al. |
| 2006/0232385 A1 | 10/2006 | Scherer et al. |

(Continued)

*Primary Examiner* — Robert Wilson
(74) *Attorney, Agent, or Firm* — Howard IP Law Group, PC (57) ABSTRACT

A network includes a network switch and plural remote nodes, each connected by a cable or channel with the network switch. The network switch includes a set of channel interfaces, each of which includes a visual indicator responsive to data traffic on the associated channel. A cable tracing arrangement includes a tracing signal generator at a channel interface of each remote node, which generates a tracing signal when cable tracing is desired. The tracing signal, when generated for cable tracing, flows over an existing cable to the associated channel interface of the network switch. At the associated channel interface, the tracing signal is converted to a visual illuminator drive signal, which illuminates the visual indicator of the channel with an indication that is distinguishable from the data traffic indication.

11 Claims, 4 Drawing Sheets

(56) References Cited

U.S. PATENT DOCUMENTS

2006/0243105 A1 11/2006 Delfini et al.
2007/0153508 A1 7/2007 Nall et al.
2007/0211464 A1 9/2007 Tao
2008/0115957 A1 5/2008 Duffy et al.
2009/0252054 A1* 10/2009 Barkan et al. ............... 370/252

* cited by examiner

NETWORK INTERFACE WITH CABLE TRACING

BACKGROUND OF THE INVENTION

Figure 1:
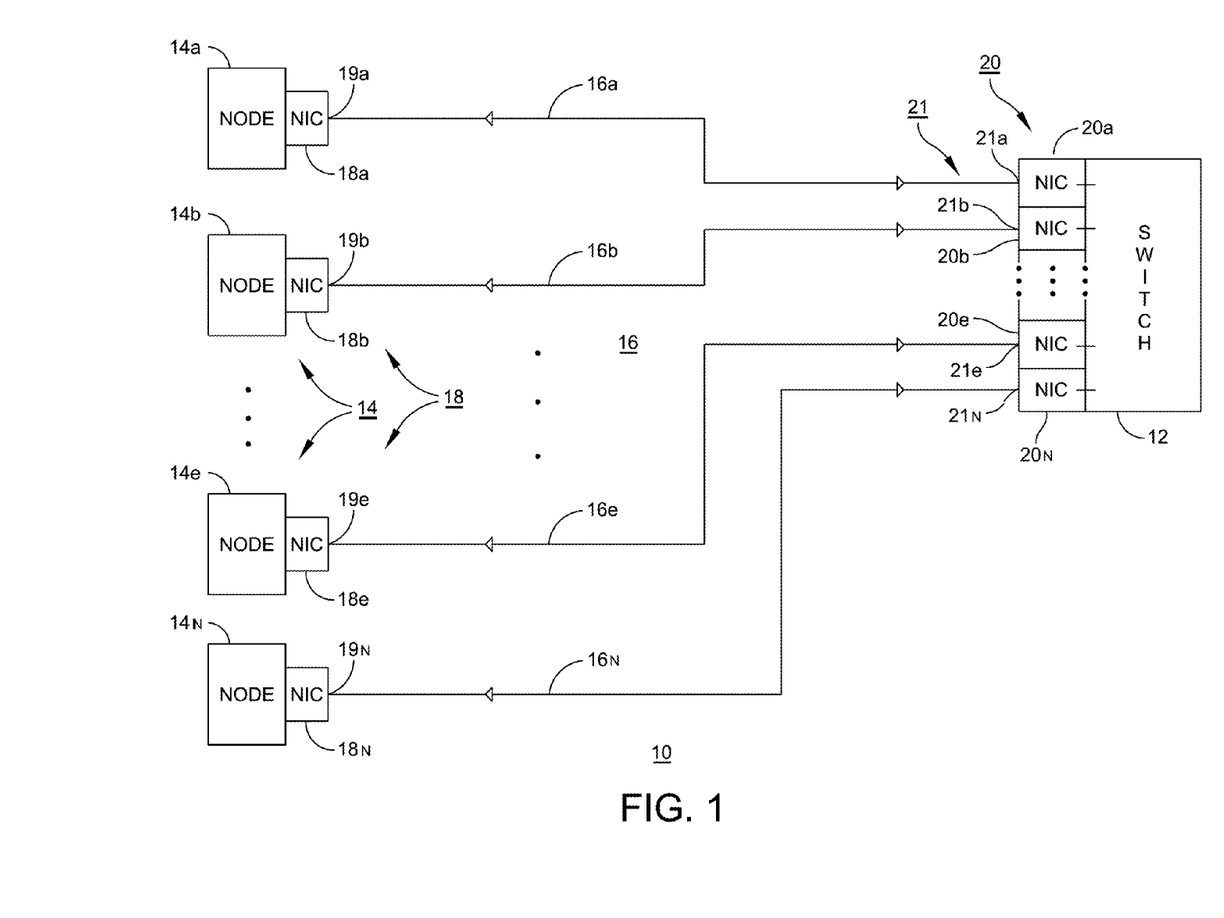
FIG. 1 is a simplified block diagram of a data network including a network switch, a plurality of remote network nodes, and network cables extending from network interface cards of the network nodes to the interface cards of the network switch.

Networking is used in many modern communication systems. Wired networking connections are made with copper or fiber optic cables connected to one or more network switches. FIG. 1 is a simplified diagram illustrating a network 10 including a network switch 12 and a plurality of remote nodes 14a, 14b, . . . , 14e, $14_N$ of a set 14 of nodes. The nodes of set 14 are physically connected with network switch 12 by means of a set 16 of cables. The nodes of set 14 may be any type of computerized devices, such as computers, sensors, or the like. Each computerized device of set 14 of nodes is fitted with a "network interface card" of a set 18 of node network interface cards (NICs). More particularly, the computerized device of node 14a is fitted with a network interface card 18a, which includes a port 19a that interfaces with the associated end of network cable 16a. Similarly, the computerized device of node 14b is fitted with a network interface card 18b, which includes a port 19b that interfaces with the associated end of network cable 16b, . . . , the computerized device of node 14e is fitted with a network interface card 18e, which includes a port 19e that interfaces with the associated end of network cable 16e, and the computerized device of node 14N is fitted with a network interface card 18N, which includes a port 19N that interfaces with the associated end of network cable 16N. The network interface cards of set 18 of network interface cards provide for control of the interface between the computerized device or portion of each node of set 14 of nodes and the associated cable of set 16 of cables. While the network interfaces are styled "cards," those skilled in the art know that the cards may not be manifested as separate printed-circuit boards, but rather each may be an integral portion of the motherboard of the associated computerized device. The computerized portion of network switch 12 similarly includes an appropriate interface to the network cables of set 16 of cables. Since the computerized portion of network switch 12 interfaces with a plurality of cables, it requires a plurality of "network interface cards," illustrated as a set 20 of network interface cards (NICs). As with the case of the network interface cards of the network nodes, the network interface cards associated with network switch 12 may not be separate cards, but may be integrated onto the motherboard of the network switch 12. Each network interface card of set 20 defines a port of set 21 of ports by which the network switch 12 communicates with remote network nodes of set 14. In FIG. 1, set 20 of interface cards includes an interface card 20a, which includes a port 21a that interfaces the computerized portion of network switch 12 with network cable 16a at a port 21a, an interface card 20b, which includes a port 21b that interfaces the computerized portion of network switch 12 at port 21b with network cable 16b, . . . , an interface card 20e, which interfaces the computerized portion of network switch 12 at a port 21e with network cable 16e, and an interface card 20N, which interfaces the computerized portion of network switch 12 at a port 21N with network cable 16N.

Figure 2:
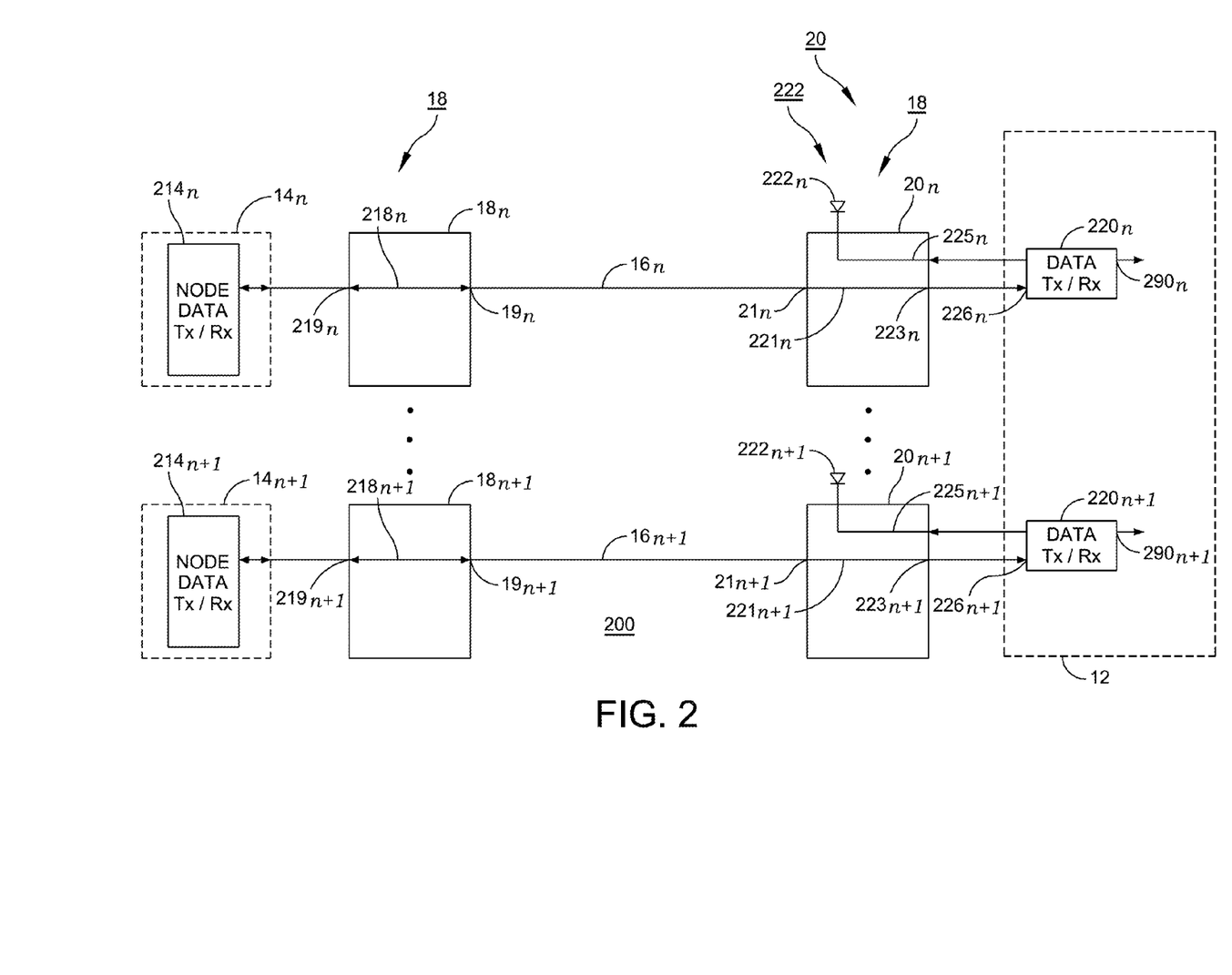
FIG. 2 is a simplified diagram illustrating some details of the arrangement of FIG. 1, including node network interface cards and switch interface cards.

FIG. 2 is a simplified diagram illustrating a portion 200 of a network such as network 10 of FIG. 1. In FIG. 2, elements corresponding to those of FIG. 1 are designated by like reference alphanumerics. In FIG. 2, a computerized node portion $14_n$ communicates data with a data transceiver (TX/RX) $220_n$ of a network switch 12. Computerized node portion 14, communicates by way of a path including a port $219_n$, a path $218_n$, and port 19, of network interface cards (NIC) $18_n$, cable path $16_n$, and port $21_n$, path $221_n$, and port 223, of NIC 20, of set 20 of network interface cards. That is, data or information flows in both directions over cable 16n between computerized node portion 14n and port 226, of network switch 12 and its data transceiver 220n. Similarly, a computerized node portion $14_{n+1}$ communicates data with a data transceiver (TX/Rx) $220_{n+1}$ by way of a path including a port $219_{n+1}$, a path $218_{n+1}$, and a port $19_{n+1}$ of network interface card (NIC) $18_{n+1}$, and by cable path $16_{n+1}$ to port $21_{n+1}$, path $221_{n+1}$, and port $223_{n+1}$ of network interface card $20_{n+1}$ of network switch 12, and to port 226n+1 of data transceiver (Tx/Rx) $220_{n+1}$. That is, data or information flows in both directions over cable $16_{n+1}$ between computerized portion $14_{n+1}$ and data transceiver $220_{n+1}$. Each data transceiver $220_n$, $220_{n+1}$ responds to the flow of data over its associated port by producing an indicator enable signal. The indicator is often a light-emitting device such as a light-emitting diode or laser, designated $222_n$ and $222_{n+1}$ in FIG. 2. In operation of the arrangement of FIG. 2, data flowing through path 16, causes transceiver $220_n$ to generate a drive signal which is applied by a path $225_n$ to indicator lamp $222_n$, and data flowing through path $16_{n+1}$ causes transceiver $220_{n+1}$ to generate a drive signal which is applied by way of a path $225_{n+1}$ to an indicator lamp $222_{n+1}$. The indicator lamps are usually arranged in a side-by-side line array, which makes it possible to compare channel indications and to identify those having out-of-the-ordinary indications. Thus, examination of the indicator lamp of each channel or path can give an indication of the flow of data, or lack thereof, between the node of set 14 (and its NIC) associated with the channel and the corresponding port (and is NIC) of the network switch 12. Very often a variable or changing voltage is applied to the indicator lamps, giving the appearance of "flickering." This is commonly accomplished by applying a sample of the data to the associated indicator lamp.

While the data transceivers $220_n$, . . . , $220_{n+1}$ of FIG. 2 are illustrated as being located within the network switch 12, they may if desired be located within the associated network interface card. Thus, for example, data transceiver 220, may be located within network interface card $20_n$. If the transceiver $220_n$ is located in network interface card $20_n$, the data flowing to and from the transceiver would be communicated by a path $290_n$ with switch 12, and likewise transceiver $220_{n+1}$ would communicate by a path $290_{n+1}$ with network switch 12. Those skilled in the art will understand that this partitioning is conceptually simple.

While there may be a physical cable connection between any particular remote node of set 14 of remote nodes (and its NIC) and a port of network switch 12, data communication is only possible if switch 12 "recognizes" node 14 to be on the same virtual local area network (VLAN) as the switch 12. This may be termed a "logical" connection. Thus, the presence of illumination of the indicator lamp of a particular channel is a sure indication of a logical connection or activity on the associated cable, and is therefore also a sure indication that the cable is physically connected at one end to a node and at the other end to an associated port of the network switch 12, else communication would not be possible.

As mentioned, many node devices can be connected to network switches. During the initial setup of a network, some network nodes connections to a network switch may be left inactive or configured for a different VLAN on the switch. That is, the nodes may be physically connected to ports of the network switch, but not logically connected. As a result, some nodes may not be logically connected to the network, even though physically connected to the switch by a cable. When not logically connected, cables coming out of a node cannot be traced "back" to the corresponding port of the network switch(es) using standard operating system commands like "ping" or "traceroute". This means that when these physically-connected but logically-disconnected nodes are to be used, their cable connection must be made or verified. In short, the cable must be traced from the node network card port to the desired switch port. The tracing problem is exacerbated by the large number of cables or network connections, as there may be as many as 300 cables connected to each network switch. There are different tracing methods. One approach is for a network technician to do trial and error. This task is made simpler if the cables are labeled, but even when the cables are coded, looking up a label code on every cable can take a long time. This method is both inefficient and time-consuming.

Simple arrangements are desired which allow physical connection tracing.

SUMMARY OF THE INVENTION

A network includes a network switch and plural remote nodes, each connected by a channel with the network switch. The network switch includes a set of channel interfaces, each of which includes a visual indicator responsive to data traffic on the associated channel. A cable tracing arrangement includes a tracing signal generator at a channel interface of each remote node, which generates a tracing signal when cable tracing is desired. The tracing signal, when generated for cable tracing, flows over a cable to the associated channel interface of the network switch. At the associated channel interface, the tracing signal is converted to a visual illuminator drive signal, which illuminates the visual indicator of the channel with an indication that is distinguishable from the data traffic indication.

A data network according to an aspect of the disclosure comprises a network switch and a plurality of network nodes. Each of the network nodes includes a network interface card. Each network interface card of each of the network nodes includes a connection port by which data can flow to and from the associated network node. Each network interface card of each network node includes a tracing signal generator which, when energized, generates a unique tracing signal at the connection port. The network switch includes a plurality of network interface cards. Each of, the network interface cards of the network switch includes a network switch port by which the network switch communicates with a remote network node. Each of the network interface cards of the network switch also includes a visual indicator. At least one of the network switch and the network interface cards of the network switch includes a data communication activity sensor. Each of the data communication activity sensors is coupled to the visual indicator of the associated network card of the network switch for activating the visual indicator with a data activity indication when data is coupled through the associated network interface card. Each of the network interface cards of the network switch also includes a sensor responsive to the tracing signal for illuminating the visual indicator of the associated network interface card of the network switch with a trace indication. In one embodiment, the trace indication is instead of said data activity indication, and in another embodiment, the trace indication is in addition to said data activity indication. In an embodiment, the tracing signal generator is energized by a switch accessible from the exterior of the network interface card of the associated network node.

A method according to another aspect of the disclosure is for trading a cable over a data network, where the data network comprises a network switch and a plurality of network nodes, and where each of the network nodes includes a network interface card. Each network interface card of each of the network nodes includes a connection port by which data can flow to and from the associated network node. Each network interface card of each network node includes a tracing signal generator which, when energized, generates a unique tracing signal at the connection port of the network interface card. The network switch includes a plurality of network interface cards, and each of the network interface cards of the network switch includes a network switch port by which the network switch communicates. Each of the network interface cards of the network switch also includes a visual indicator, at least one of the network switch and the network interface cards of the network switch includes a data communication activity sensor. Each of the data communication activity sensors is coupled to the visual indicator of the associated network interface card of the network switch for activating the visual indicator with a data activity indication when data is coupled through the associated network switch port of the associated network interface card. Each of the network interface cards of the network switch also includes a sensor responsive to the tracing signal for illuminating the visual indicator of the associated network interface card of the network switch with a trace indication. The network also includes a plurality of cables interconnecting at least some of the connection ports of the network interface cards of the network nodes with at least some of the network switch ports of the network interface cards of the network switch. The method comprises the steps of, at the network interface card of a selected one of the network nodes, energizing the tracing signal generator to thereby generate the unique tracing signal at the connection port of the network interface card of the selected one of the network nodes, whereby the unique tracing signal flows from the connection port of the network interface card of the selected one of the network nodes by way of a corresponding cable of the set of cables to that network interface card of the network switch with which the corresponding cable is associated. At the network interface card of the network switch with which the corresponding cable is associated, responding to the unique tracing signal by illuminating the associated indicator lamp with the trace indication in a manner distinguished from the data activity indication.

DESCRIPTION OF THE INVENTION

According to an aspect of the disclosure, tracing capability is added to the Network Interface Card (NIC) itself. Circuits are added to both the network switch (12 of FIGS. 1 and 2) NICs of set 20 of FIG. 2 and to the computerized node NICs of set 18 of FIG. 2.

Figure 3:
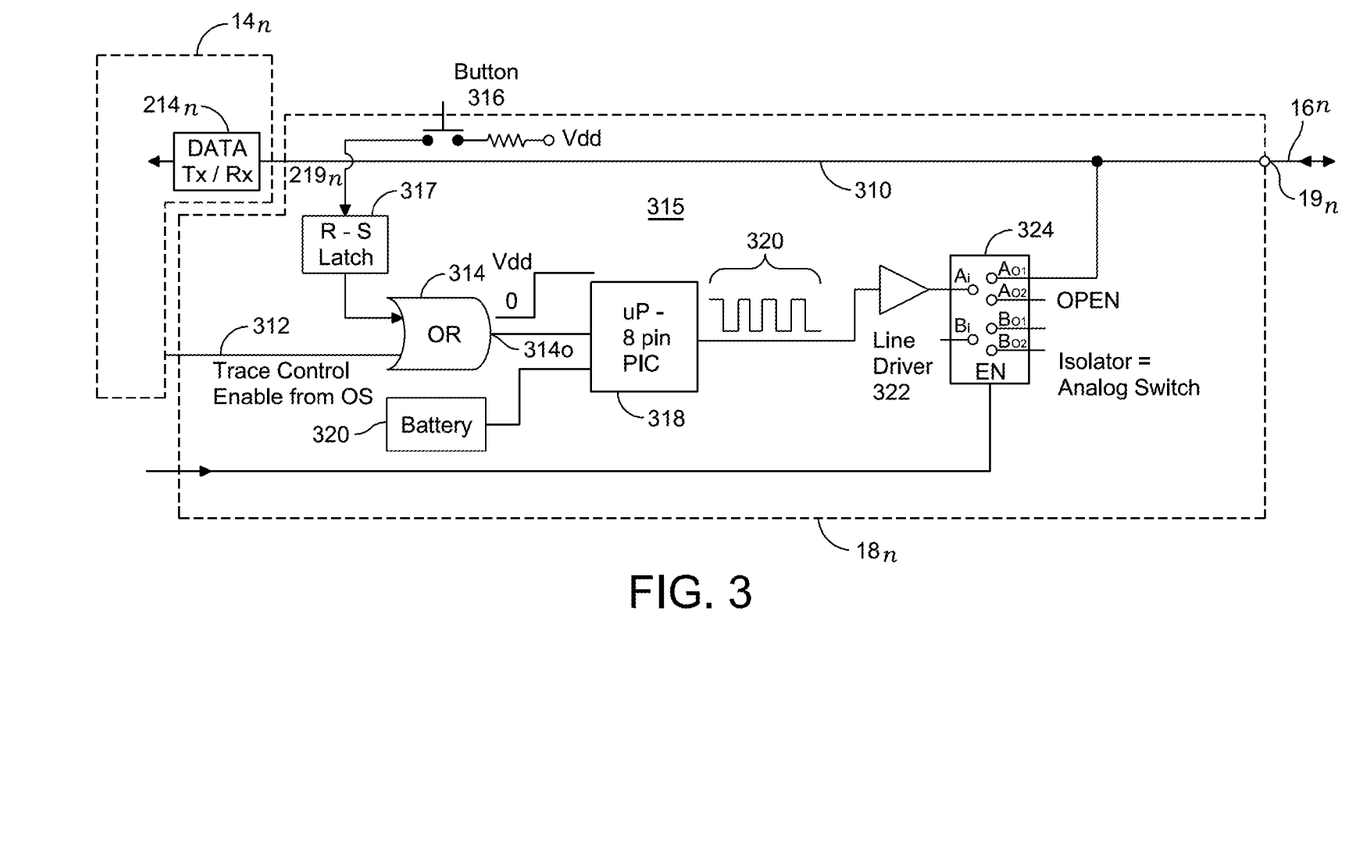
FIG. 3 is a simplified diagram in block and schematic form, illustrating some details of a modified Transmit (Tx) portion node interface card according to an aspect of the disclosure.

FIG. 3 is a simplified schematic diagram illustrating inter alia the circuits of each remote node network interface card which allow tracing according to aspects of the disclosure. In FIG. 3, a network interface card (NIC) $18_n$ is connected by a data path 310 to data transceiver (Tx/Rx) 214n of computerized remote node 14n and by way of cable path 16, to the corresponding NIC of set 20a of network switch 12 of FIG. 2. A manual trace enable pushbutton switch 316 is arranged to be actuated from outside the network interface card $18_n$ of FIG. 3. When actuated, manual trace enable pushbutton switch 316 connects a direct voltage source Vdd to an input port of an RS latch 317. If the microprocessor is set up for switch de-bouncing, the RS latch may not be necessary. Pressing pushbutton switch 316 repeatedly sequentially sets and resets latch 317. Latch 317 is coupled to an input port of an OR gate 314. When actuated, the trace enable signal latched by RS latch 317 is coupled through gate 314. It may be desired to initiate the trace enable signal from a remote node via a user generated Operating System command associated with the computerized portion of node 14n, and such a trace enable signal is applied over a path 312 to another input port of OR gate 314. This allows a tracing command to be implemented by either pushing button 316 on the network interface card 18n or by a user typing a command that propagates to the network interface portion of the remote node 14n; this requires that a new command be added, to the Operating System. The command allows initiating the tracing via a user interface rather than from the pushbutton). The trace command is manifested in FIG. 3 by a level of Vdd (a logic HIGH) at the output port 314o of OR gate 314. Naturally, the level of Vdd could instead represent a logic zero (0) state. The trace command is applied from output port 314o of OR gate 314 to an input port of a microprocessor (µP) 318. Microprocessor 318 and other portions of NIC 18n can receive power from a battery 320 or from an existing network interface card power connection (not illustrated. The provision of a battery allows cable connection tracing even if the computerized portion $14_n$ of the remote node is not energized. Put another way, the battery 320 allows cable physical connection tracing even if the computer of the remote node is OFF. Microprocessor 318 is preprogammed so as to produce a unique data pattern in response to the trace control command. The unique data pattern is the same for all network interface cards, and is unique only in that it differs from other data patterns that might be communicated over the network. The unique trace control data pattern is represented in FIG. 3 by a waveform 320. The unique data pattern can be produced one-time-only to thereby signify that tracing is to be performed continuously thereafter (Tracing ON) until a second unique Tracing OFF command is issued, or the unique data pattern can be repeated continuously to signify that tracing is to continue for so long as the command is repeated. The unique data pattern 320 is applied from microprocessor 318 to Transmit portion port 19n by way of a line driver 322 and a line isolator 324. Isolator 324 is manifested in this particular example by an analog switch integrated circuit. With this arrangement, when a unique trace enable signal 320 is generated by microprocessor 318, it is coupled at port $19_n$ onto cable $16_n$ and arrives at the network interface card which is connected to cable $16_n$.

Figure 4:
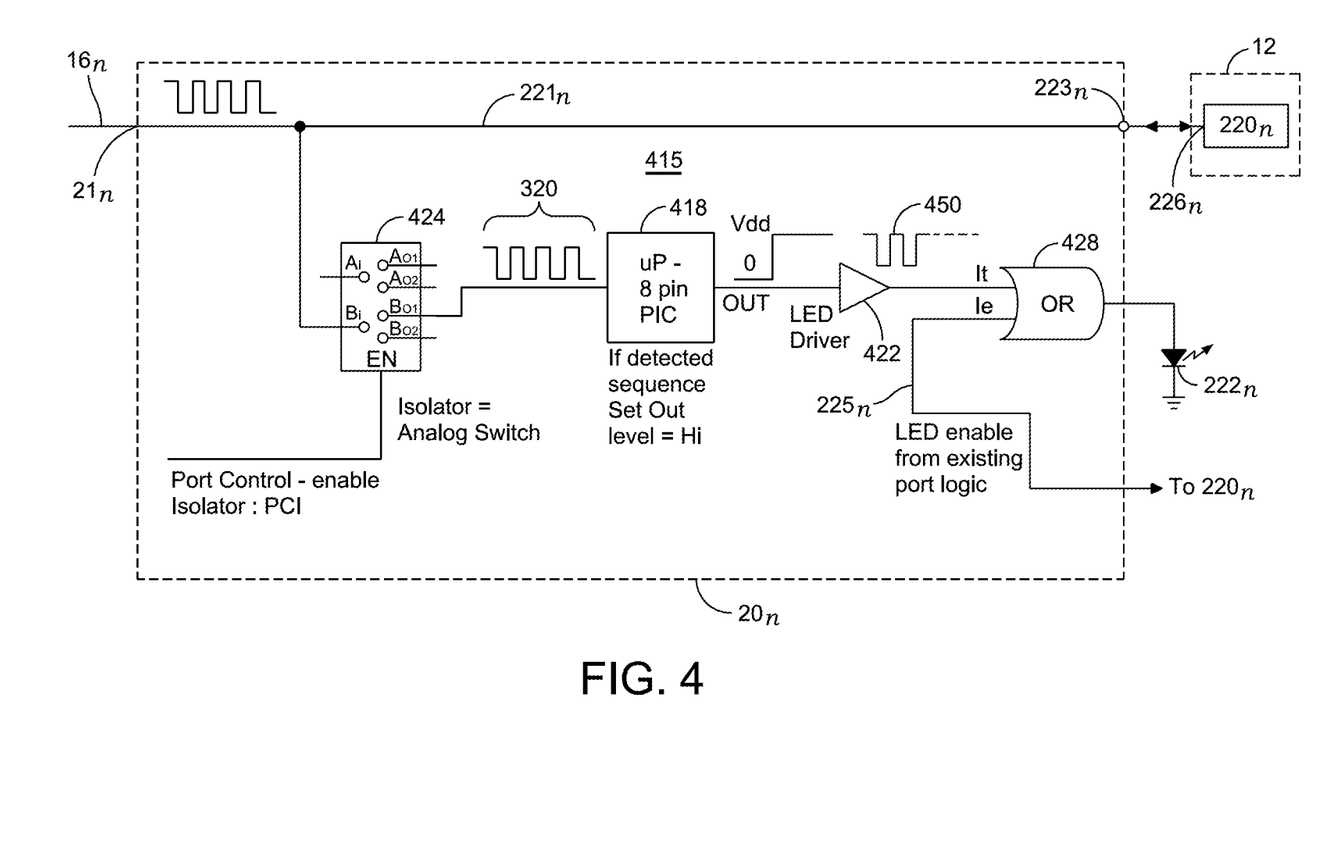
FIG. 4 is a simplified diagram in block and schematic form, illustrating some details of a modified Receive (Rx) potion of a network switch interface card according to an aspect of the disclosure.

FIG. 4 is a simplified diagram in block and schematic form illustrating details of the network interface card $20_n$ associated with network switch 12 for implementation of cable tracing. In FIG. 4, the unique trace enable signal 320 arrives at a receive portion of port $21_n$ from cable $16_n$, and is routed over path 221n to an isolator 424, which is manifested, as in the case of FIG. 3, by an analog switch. Analog switch 424 is also arranged to receive a port control isolator enable signal from the network switch 12. The port control isolator enable signal is for security, and more particularly to prevent malicious or accidental enabling of the tracing feature. When isolator 424 is enabled, the unique trace enable signal is coupled to an input port of a microprocessor (µP) 418. Microprocessor 418 is preprogrammed to respond to the unique trace enable signal and to produce a trace command signal in the form of a logic high (Vdd). The Vdd signal from microprocessor 418 is applied through an illuminator or LED driver amplifier 422, and through an OR gate 428 to illuminate the associated indicator lamp 222n. Indicator lamp 222n is illustrated as being a light-emitting diode.

As mentioned, the indicator lamps of network switch 12 are arrayed so that differences among the patterns or levels of illumination stand out. The tracing of the physical connection is performed with the same set of illuminators or lamps that is used for logical connection indication. That is, at least some of the indicator lamps of set or array 222 of indicator lamps may already be indicating a logical connection by flickering or otherwise indicating. During tracing of physical connections, it may be assumed that some of the indicator lamps of the array will be flickering or otherwise indicating the presence of data, and some will be OFF or not illuminated, indicating the lack of at least a logical connection. It is desirable to make the illumination of the indicator lamp associated with the tracing of the physical coupling or connection distinguishable from the illumination arising from a logical connection. That is, the illumination of the indicator lamp associated with the tracing of the physical connection should be easily distinguishable from the illumination associated with a logical connection. In the embodiment of FIG. 4, application of a fixed direct voltage results in a non-flickering illumination, and a further distinguishing characteristic is provided by an increased level of illumination, provided by application to the indicator lamp of a greater current than that associated with indication of a logical connection. This is the purpose of the lamp driver 422. Here the effect is that of adding tracing current $I_t$ to the existing current $I_e$, thus increasing the total driving current of the indicator lamp 222n. In addition, or as an alternative, microprocessor 418 may produce at its output (OUT) port a modulation pattern instead of a constant voltage Vdd, to thereby make the indicator lamp 222n turn ON and OFF (or at least change amplitude) in a pattern that indicates to a user that this is the port being searched for. This pattern is designated 450 in FIG. 4. Pattern 450 will in general NOT be the same as pattern 320. Pattern 320 is used for communication and should have a transmission rate higher than that of pattern 350 as well as a specific noise-tolerant modulation. Pattern 450 should be such that a human eye can notice variations.

In FIG. 4, the logical connection illumination is provided from network switch 12 to the illustrated NIC 20n by way of path 225. That is, the illuminator lamp (LED) enable signal representing a logical connection is generated in the existing port logic and coupled to NIC $20_n$ by way of path $225_n$, and applied to an input port of OR gate 428. Thus, in the absence of a physical trace command, indicator lamp 222n will be energized to indicate a logical connection, as by flickering. In the presence of a physical trace command, the output of OR gate 428 is a constant, high level signal, which provides bright fixed lamp illumination, which is readily distinguishable from flickering. Thus, a simple viewing of the array of indicator lamps should suffice to clearly indicate which NIC of network switch 12 is physical connection to the network node from which physical trace was requested.

On the network switch side of the NIC pair, the modification described in conjunction with FIGS. 3 and 4 allows Layer 1 messages of a specific pattern that enable or turn on the indicator lamp or LED and modulate its light with a specific pattern. This pattern indicates that tracing mode is on. The modifications are made to the switch port front-end logic and in the switch operating system. The modification in switch port front-end logic enables a control line to allow passage of the tracing message and modulation of the indicator lamp or LED with the tracing pattern. The modification of the switch operating system change adds a "trace on" command to allow turning the tracing ON or OFF. The tracing messages will never go above Layer 1 of the communication protocol stack, so there should not be any danger of malicious security attacks.

Similar changes are made to the remote node or computer NIC. One change is to modify NIC transmit logic to send/receive tracing message upon a control signal from an operating system or from a mechanical switch. Another change is to add a command to the computer operating systems (Linux/Unix/Windows) to allow enabling of tracing capabilities of the NIC tracer from the operating system command shell.

Addition of the physical tracing function to a network already provided with an array of indicator lamps minimally increases the cost. Non-recurring expense (NRE) of the design change is low, because changing a PCB design and minor electronic modifications are many times cheaper than new cable designs.

Thus, a network according to an aspect of the disclosure includes a network switch and plural remote nodes, each connected by a channel with the network switch. The network switch includes a set of channel interfaces, each of which includes a visual indicator responsive to data traffic on the associated channel. A cable tracing arrangement includes a tracing signal generator at a channel interface of each remote node, which generates a tracing signal when cable tracing is desired. The tracing signal, when generated for cable tracing, flows over a cable to the associated channel interface of the network switch. At the associated channel interface, the tracing signal is converted to a visual illuminator drive signal, which illuminates the visual indicator of the channel with an indication that is distinguishable from the data traffic indication.

A data network (10) according to an aspect of the disclosure comprises a network switch (12) and a plurality of network nodes (set 14). Each of the network nodes (of set 14) includes a network interface card (set 18). Each network interface card (of set 18) of each of the network nodes (of set 14) includes a connection port (of set 19) by which data can flow to and from the associated network node (of set 14). Each network interface card (of set 20) of each network node (of set 14) includes a tracing signal generator (315) which, when energized, generates a unique tracing signal (320) at the connection port (of set 19). The network switch (12) includes a plurality of network interface cards (of set 20). Each of the network interface cards (of set 20) of the network switch (12) includes a network switch port (of set 21) by which the network switch (12) communicates (by a cable of set 16) with a remote network node (of set 14). Each of the network interface cards (of set 20) of the network switch (12) also includes a visual indicator (of set 222). At least one of the network switch (12) and the network interface cards (of set 20) of the network switch (12) includes a data communication activity sensor (set 220). Each of the data communication activity sensors (of set 220) is coupled to the visual indicator (set 222) of the associated network card (of set 20) of the network switch (12) for activating the visual indicator (222) with a data activity indication when data is coupled through the associated network interface card. Each of the network interface cards (of set 20) of the network switch (12) also includes a sensor (415) responsive to the tracing signal (320) for illuminating the visual indicator (222) of the associated network interface card (of set 20) of the network switch (12) with a trace indication. In one embodiment, the trace indication is instead of said data activity indication, and in another embodiment, the trace indication is in addition to said data activity indication. In an embodiment, the tracing signal generator (315) is energized by a switch (316) accessible from the exterior of the network interface card (of set 18) of the associated network node (of set 14).

A method according to another aspect of the disclosure is for tracing a cable (of set 16) over a data network (10), where the data network (10) comprises a network switch (12) and a plurality of network nodes (set 14), and where each of the network nodes (of set 14) includes a network interface card (set 18). Each network interface card (of set 18) of each of the network nodes (of set 14) includes a connection port (of set 19) by which data can flow to and from the associated network node (of set 14). Each network interface card (of set 20) of each network node (of set 14) includes a tracing signal generator (315) which, when energized, generates a unique tracing signal (320) at the connection port (of set 19) of the network interface card (of set 20). The network switch (12) includes a plurality of network interface cards (of set 20), and each of the network interface cards (of set 20) of the network switch (12) includes a network switch port (of set 21) by which the network switch (12) communicates. Each of the network interface cards (set 20) of the network switch (12) also includes a visual indicator (of set 222), at least one of the network switch (12) and the network interface cards (of set 20) of the network switch (12) includes a data communication activity sensor (set 220). Each of the data communication activity sensors (of set 220) is coupled to the visual indicator (of set 222) of the associated network interface card (of set 20) of the network switch (12) for activating the visual indicator with a data activity indication when data is coupled through the associated network switch port (of set 21) of the associated network interface card. Each of the network interface cards (of set 20) of the network switch (12) also includes a sensor (415) responsive to the tracing signal (320) for illuminating the visual indicator (222) of the associated network interface card (of set 20) of the network switch (12) with a trace indication. The network (10) also includes a plurality of cables (set 16) interconnecting at least some of the connection ports (set 19) of the network interface cards of the network nodes (of set 14) with at least some of the network switch ports (of set 21) of the network interface cards (set 18) of the network switch (12). The method comprises the steps of, at the network interface card of a selected one of the network nodes, energizing the tracing signal generator (315) to thereby generate the unique tracing signal (320) at the connection port (of set 19) of the network interface card of the selected one of the network nodes, whereby the unique tracing signal flows from the connection port (of set 19) of the network interface card of the selected one of the network nodes by way of a corresponding cable of the set of cables to that network interface card of the network switch (12) with which the corresponding cable is associated. At the network interface card of the network switch (12) with which the corresponding cable is associated, responding to the unique tracing signal by illuminating the associated indicator lamp with the trace indication in a manner distinguished from the data activity indication.

What is claimed is:

1. A data network, said data network comprising:
   a network switch; and
   a plurality of network nodes;
   wherein each of said network nodes includes a network interface card, each network interface card of each of said network nodes includes a connection port by which data can flow to and from the associated network node, each network interface card of each network node includes a tracing signal generator which, when energized, generates a unique tracing signal at said connection port; and wherein said network switch includes a plurality of network interface cards, each of said network interface cards of said network switch includes a network switch port by which said network switch communicates with a remote network node of the plurality of nodes, each of said network interface cards of said network switch also includes a visual indicator, at least one of said network switch and said network interface cards of said network switch includes a data communication activity sensor, each of said data communication activity sensors being coupled to the visual indicator of the associated network card of said network switch for activating said visual indicator with a data activity indication when data is coupled through said associated network interface card, and each of said network interface cards of said network switch also includes a sensor responsive to said tracing signal for illuminating the visual indicator of the associated network interface card of said network switch with a trace indication wherein the trace indication is distinguishable from the data activity indication.

2. A data network according to claim 1, wherein said tracing signal generator is energized by a switch located on the exterior of the network interface card of the associated network node.

3. A data network according to claim 1, wherein said sensor is responsive to said tracing signal for illuminating said visual indicator of said associated network interface card of said network switch with a trace indication instead of with said data indication.

4. A data network according to claim 1, wherein said sensor is responsive to said tracing signal for illuminating said visual indicator of said associated network interface card of said network switch with a trace indication in conjunction with said data indication.

5. The data network of claim 1, wherein each of said network interface cards of said network nodes comprises a power source for powering said trace signal generator.

6. The data network of claim 5, wherein said power source comprises a battery.

7. A method for tracing a cable over a data network, said method comprising the steps of:
energizing a tracing signal generator of a network interface card of a selected one of a plurality of network nodes of said data network to thereby generate a unique tracing signal at a connection port of said network interface card of said selected one of said network nodes, whereby said unique tracing signal flows from said connection port of said network interface card of said selected one of said network nodes by way of a corresponding cable of a set of cables to a network interface card of a network switch of said data network with which said corresponding cable is associated; and
responding to said unique tracing signal by illuminating an associated visual indicator of said network interface card of said network switch with said trace indication in a manner distinguished from a data activity indication, said data activity indication provided when data is coupled through an associated network switch port of the associated network interface card.

8. A network comprising:
a network switch; and
a plurality of remote nodes;
wherein each of the remote nodes is connected by a channel with the network switch, the network switch including a set of channel interfaces, each of the channel interfaces including a visual indicator responsive to data traffic on the associated channel;
wherein said network switch includes a cable tracing arrangement, the cable tracing arrangement including a network interface card having a tracing signal generator at a channel interface of each remote node, the tracing signal generator generating a tracing signal when cable tracing is desired, said tracing signal, when generated for cable tracing, flows over a cable to the associated channel interface of the network switch, and at the associated channel interface, the tracing signal is converted to a visual illuminator drive signal, which illuminates the visual indicator of the channel with an indication that is distinguishable from the data traffic indication.

9. A method for tracing a cable over a data network, said method comprising the steps of:
energizing a tracing signal generator of a network interface card of a selected one of a plurality of network nodes of said data network to generate a unique tracing signal at said network interface card, said unique tracing signal flowing by way of a cable of a set of cables to a network interface card of a network switch of said data network with which said corresponding cable is associated; and
in response to the unique tracing signal, illuminating a visual indicator of the network interface card with a trace indication wherein the trace indication is distinguishable from a data activity indication.

10. A network comprising:
a network switch; and
a plurality of remote nodes;
wherein each of the remote nodes is connected by a cable with the network switch, the network switch including a set of cable interfaces, each of the cable interfaces including a visual indicator responsive to data traffic on the associated cable;
wherein said network switch includes a cable tracing arrangement, the cable tracing arrangement including a network interface card having a tracing signal generator at a cable interface of each remote node, the tracing signal generator generating a tracing signal when cable tracing is desired, said tracing signal, when generated for cable tracing, flows over a cable to the associated cable interface of the network switch, and at the associated channel interface, the tracing signal is converted to a visual illuminator drive signal, which illuminates the visual indicator of the cable with an indication that is distinguishable from the data traffic indication.

11. A network interface card configured to connect to a network node comprising:
a tracing signal generator, which, when energized, generates a unique tracing signal at a connection port of the network interface card;
a power supply operatively connected to the tracing signal generator; and
a user-activated switch;
wherein the user-activated switch is configured to selectively control the operation of the tracing signal generator, wherein the tracing signal is configured to illuminate a visual indicator of an associated network interface card of the network node with a trace indication, the trace indication distinguishable from a data traffic indication.

* * * * *